United States Patent
Dubuis et al.

(10) Patent No.: US 7,463,553 B2
(45) Date of Patent: Dec. 9, 2008

(54) UNDERWATER DETECTION DEVICE

(75) Inventors: Jérôme Dubuis, Nishinomiya (JP); Hitoshi Maeno, Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 0 days.

(21) Appl. No.: 12/076,953

(22) Filed: Mar. 25, 2008

(65) Prior Publication Data
US 2008/0239870 A1  Oct. 2, 2008

(30) Foreign Application Priority Data
Mar. 26, 2007  (JP)  ............... 2007-078771

(51) Int. Cl.
*G01S 15/87* (2006.01)
(52) U.S. Cl. ............... 367/98; 367/103
(58) Field of Classification Search .......... 367/103, 367/104, 87, 98, 88
See application file for complete search history.

(56) References Cited

U.S. PATENT DOCUMENTS

| | | | | |
|---|---|---|---|---|
| 4,204,280 A | * | 5/1980 | Slaton | 367/98 |
| 4,204,281 A | * | 5/1980 | Hagemann | 367/98 |
| 4,955,003 A | * | 9/1990 | Goldman | 367/125 |
| 2007/0291589 A1 | * | 12/2007 | Kawabata et al. | 367/88 |
| 2008/0048907 A1 | * | 2/2008 | Matsuura et al. | 342/147 |

FOREIGN PATENT DOCUMENTS

JP  2006-52987 A  2/2006

* cited by examiner

*Primary Examiner*—Dan Pihulic
(74) *Attorney, Agent, or Firm*—Birch, Stewart, Kolasch & Birch, LLP

(57) ABSTRACT

In an under water detection for detecting the phase difference of an echo by two reception beams according to a split beam method, the difference $\Delta\theta$ between the phase difference of an echo detected by first and second reception beams formed in some direction and the phase difference of the echo detected by first and second reception beams which is formed in a direction rotated from the former direction concerned by a predetermined angle is detected by a phase detector. A reliability judging unit judges whether the difference $\Delta\theta$ detected by the phase detector is within a predetermined range or not. If the difference $\Delta\theta$ is within the predetermined range, an echo is displayed on a display unit. If the difference $\Delta\theta$ is not within the predetermined range, the echo is displayed with a specific color tone or the echo is not displayed.

3 Claims, 6 Drawing Sheets

→ DIRECTION TO STEM

UNDERWATER DETECTION DEVICE

BACKGROUND OF THE INVENTION

1. Field of the Invention

The present invention relates to an underwater detection device such as a forward detection sonar, and particularly to an underwater detection device using a split beam type transducer array.

2. Description of the Related Art

A forward detection sonar is an underwater detection device for measuring the direction and distance to an obstacle and displaying pictures of the obstacle in order to prevent occurrence of a collision accident or a trouble of navigation before something happens when there is some obstacle such as a shallow place, a breakwater, a driftwood or the like ahead of a ship. Such a forward detection sonar is mounted on the hull of a ship, and transmits/receives ultrasonic waves in a 90° fan-shaped area going from the horizontal direction parallel to the sea level to the vertical direction below the ship, whereby a target in this range is detected. For example, when a breakwater exists ahead of the ship, not only the echo from the bottom of the ocean, but also the strong echo returning from the breakwater are displayed.

There are several types of forward detection sonars, but a split beam type forward detection sonar has a transducer array which is divided into two arrays. A receiving beam is formed on each array. The calculation of the coming direction of the echo, that is the direction of the target is based on the phase difference between the echoes received on both arrays and knowing the distance between the two arrays. JP-A-2006-52987 discloses a split beam type forward detection sonar.

Existence of bubbles in water induces a problem in the forward detection sonar. The bubbles are mainly generated by rotation of propellers of another ship or a motor-driven boat navigating ahead of the ship having the sonar concerned. These bubbles reflect ultrasonic waves transmitted from the forward detection sonar, and particularly when a large amount of bubbles occur at a shallow place, the signal intensity of the echo reflected from a cluster of bubbles increases. As a result, the echo based on the bottom of the ocean and the echo based on the bubble cluster appear connected to one another with the same color (for example, brown) on a display screen as shown in FIG. 11, which causes a user to misidentify the echo based on the bubble cluster as the echo of a breakwater.

SUMMARY OF THE INVENTION

The present invention has been implemented in view of the foregoing problem, and has the objective to provide an underwater detection device that can identify an echo based on bubbles in water and prevent misidentification on a display screen.

In order to achieve the above objective, an underwater detection device according to the present invention is a split beam type device with a transducer array for transmitting ultrasonic waves to a predetermined area in water and receiving an echo reflected from a target. The transducer array is divided into a first array and a second array, and a first reception beam formed by the first array and a second reception beam formed by the second array are formed in plural directions in the predetermined area to receive an echo. Then, the coming direction of the echo is detected on the basis of the phase difference of the echo received by the first and second arrays and the distance between the first and second arrays, and also the picture of the echo concerned is displayed on the screen. The underwater detection device according to the present invention comprises a detecting unit for detecting the difference between the phase difference of the echo detected by the first and second reception beams formed in some direction and the phase difference of the echo detected by the first and second reception beams formed in a direction which is rotated from the former direction by a predetermined angle, and a judging unit for judging whether the difference detected by the detecting unit is a value within a predetermined range, and when it is judged by the judging unit that the difference concerned is within the predetermined range, the echo concerned is displayed.

According to the present invention, an echo from a fixed target and an echo from a cluster of bubbles are discriminated from each other (identified) by utilizing the fact that the difference between the phase difference of the echo detected by the first and second reception beams formed in some direction and the phase difference of the echo detected by the first and second reception beams formed in the direction rotated from the former direction by the predetermined angle converges within a predetermined range in the case of the echo from a single fixed target, and the difference concerned is out of the predetermined range due to various kinds of causes such as disturbance of phase, etc. in the case of the echo from the cluster of bubbles. That is, a threshold value is set to the difference of the phase differences, and an echo is displayed only when the difference concerned is within a predetermined range. Accordingly, even when the signal intensity of the echo based on bubbles is large, it is not displayed with the original color corresponding to the signal intensity, and thus there is no risk that the echo based on bubbles is misidentified as an echo based on a breakwater or the like, so that the echo can be surely identified.

In the present invention, when it is judged by the judging unit that the value of the difference of the phase differences is not within the predetermined range, the display of the echo concerned may be disabled. Accordingly, the echo based on bubbles is never displayed on the display screen, and thus there is no risk that the echo based on bubbles is misidentified as another echo, so that the echo can be more surely identified.

Still furthermore, in the present invention, when it is judged by the judging unit that the value of the difference of the phase differences is not within the predetermined range, the echo concerned may be displayed with a specific color tone. Accordingly, for example by displaying the echo based on bubbles with pale color of the sea, the echo concerned can be easily identified as the echo based on bubbles, and also there is no risk that the echo based on bubbles is misidentified as another echo because it is displayed with inconspicuous color.

According to the present invention, the echo based on bubbles is not displayed with the original color corresponding to the signal intensity thereof, and thus there is no risk that the echo based on bubbles is misidentified as an echo based on a shallow place, a breakwater or the like, so that the echo can be surely identified.

DETAILED DESCRIPTION OF THE PREFERRED EMBODIMENT

Figure 1:
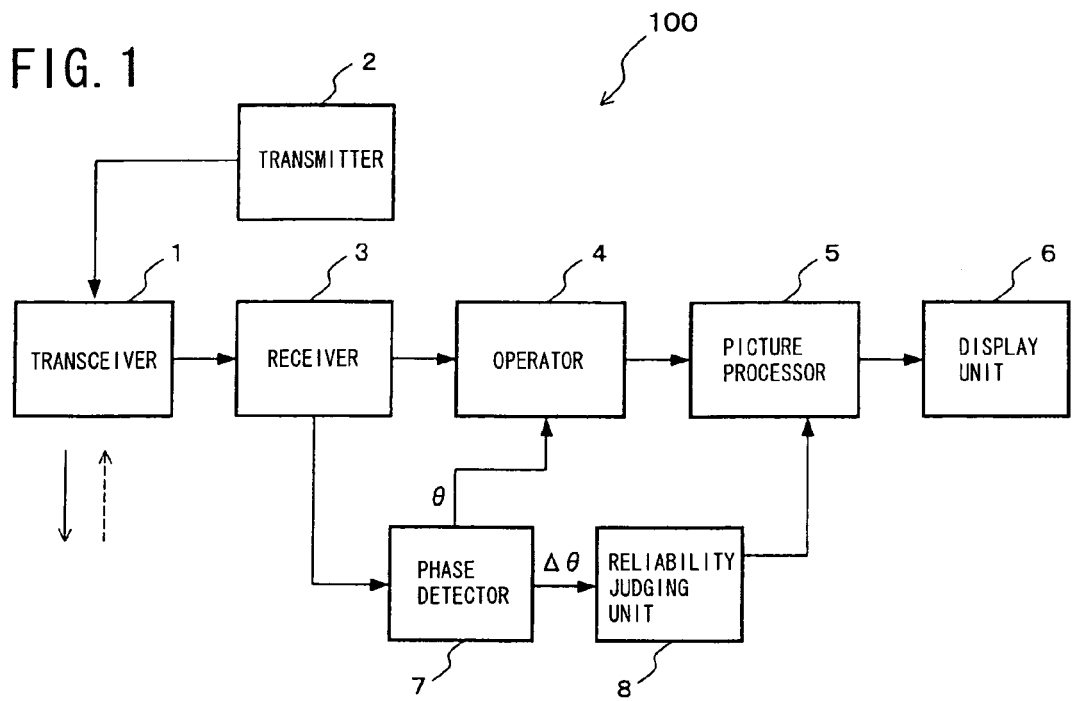
FIG. 1 is a block diagram showing an embodiment of an underwater detection device according to the present invention.

FIG. 1 is a block diagram showing an embodiment of an underwater detection device according to the present invention. In the following description, a forward detection sonar 100 is used as the underwater detection device. In FIG. 1, reference numeral 1 represents a transceiver for transmitting ultrasonic waves to a predetermined area in water and receiving an echo reflected from a target, reference numeral 2 represents a transmitter for generating a transmission signal to be supplied to the transceiver 1, and reference numeral 3 represents a receiver for receiving an echo which is received by the transceiver 1 and converted to an electrical signal, and also forming a reception beam described later. Reference numeral 4 represents a calculator for executing a predetermined calculation on the basis of information of the echo received by the receiver 3, reference numeral 5 represents a picture processor for executing the processing of displaying pictures of an echo on the basis of the calculation result in the calculator 4, and reference numeral 6 represents a display unit such as LCD (Liquid Crystal Display) or the like for displaying the pictures of the echo on the basis of a picture signal (video signal) output from the picture processor 5.

Reference numeral 7 represents a phase detector for detecting the phase difference of the echo received by the receiver 3 and the difference of phase differences, and information of the phase difference $\theta$ is supplied to the calculator 4 and information of the difference $\Delta\theta$ of the phase differences is supplied to a reliability judging unit 8. The reliability judging unit 8 judges on the basis of the value of the difference $\Delta\theta$ of the phase differences whether the received echo is reliable or not, that is, whether it is based on bubbles or not, and supplies the judgment result to the picture processor 5. The phase detector 7 constitutes an embodiment of the detecting unit according to the present invention, and the reliability judging unit 8 constitutes an embodiment of the judging unit according to the present invention.

Figure 2:
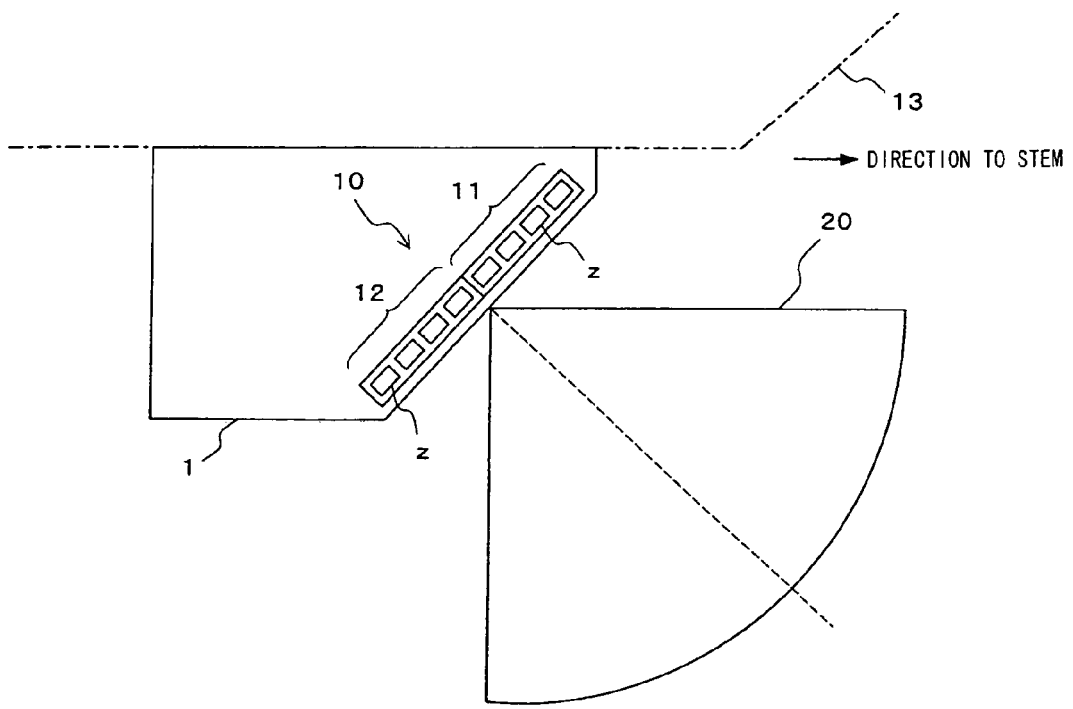
FIG. 2 is a diagram showing a transducer array and a transmission beam.

As shown in FIG. 2, the transceiver 1 is mounted on the hull of a ship 13, and it has a transducer array 10 in which plural (eight in this case) ultrasonic transducers z are arranged on a line. The transducer array 10 is divided into an array 11 (first array) and an array 12 (second array), and each of the arrays 11 and 12 has four ultrasonic transducers z. It is also possible to arrange the arrays with common transducers in both arrays. Reference numeral 20 represents an ultrasonic beam transmitted from the transducer array 10. It is a 90° fan-shaped beam so that the detection area extends from the horizontal direction parallel to the sea level to the vertical direction below the ship.

Figure 3:
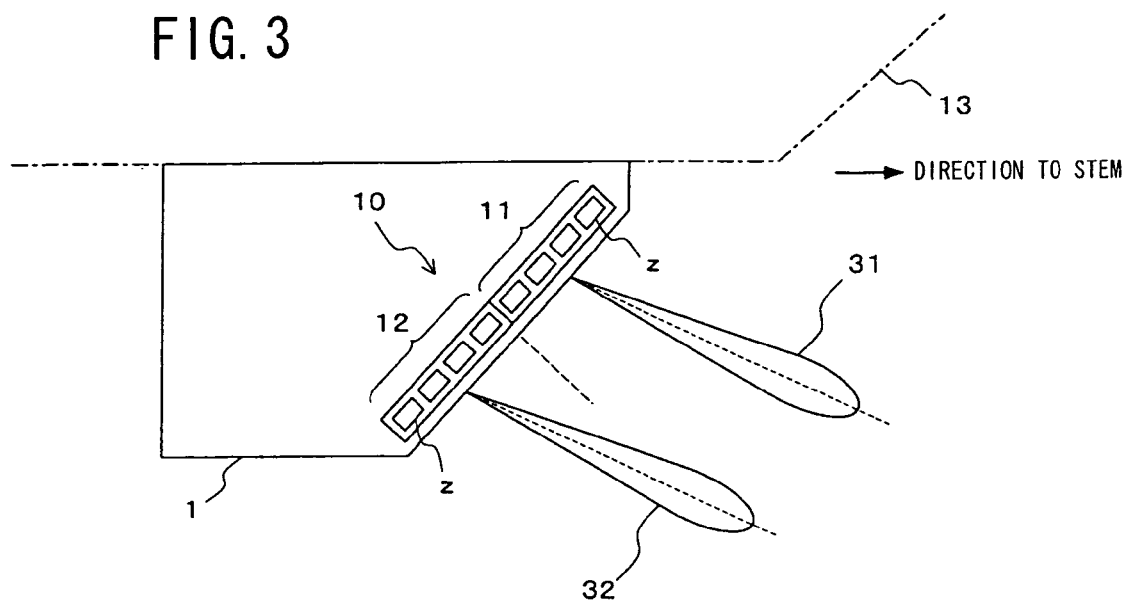
FIG. 3 is a diagram showing a transducer array and a pair of reception beams.
Figure 4:
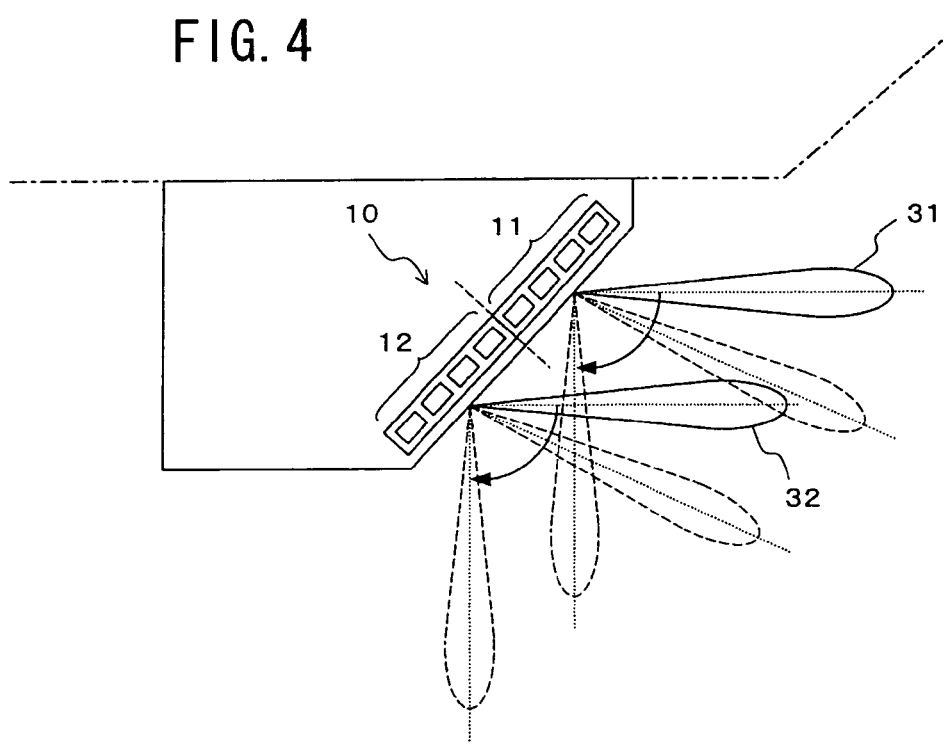
FIG. 4 is a diagram showing how reception beams are formed.

After the ultrasonic beam 20 is transmitted, reception beams 31, 32 are formed in the arrays 11, 12 as shown in FIG. 3, and an echo reflected from a target, coming back to the transducer array 10 is received by these reception beams 31, 32. As shown in FIG. 4, the reception beams 31, 32 are formed within the 90° detection area described above, and echoes in the detection area are received. Each of the reception beams 31, 32 is formed at an angular interval of 1°, for example. Accordingly, ninety reception beams 31, 32 are discretely formed in the detection area.

Figure 5:
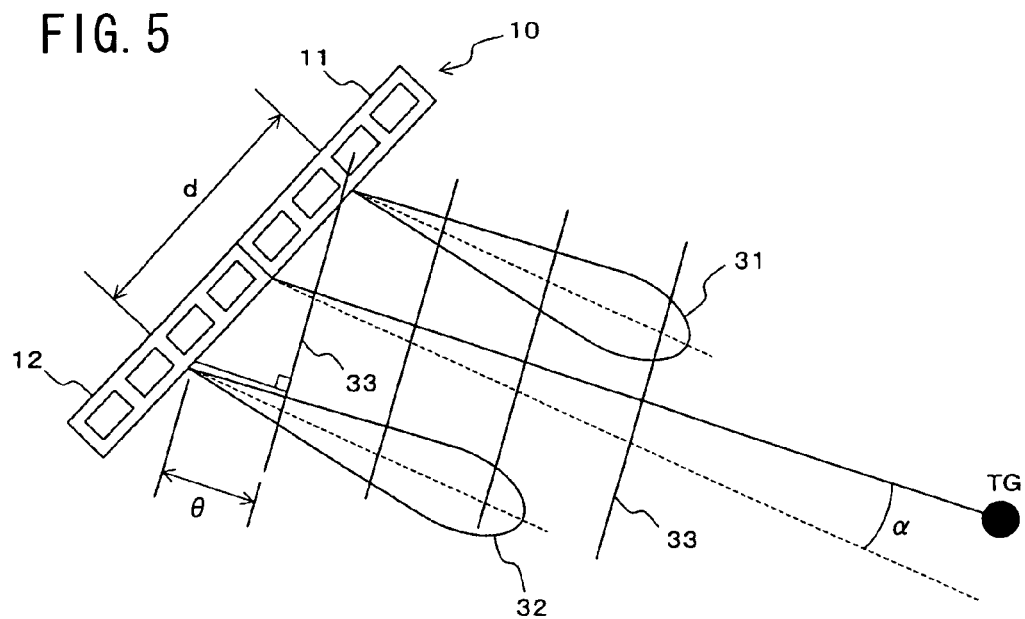
FIG. 5 is a diagram showing the principle of a split beam method.

The phase difference of the echo received by the arrays 11, 12 is detected by the phase detector 7 (FIG. 1), whereby the direction to the target can be determined by using a well-known split beam method in the calculator 4. FIG. 5 is a diagram showing the principle of the split beam method. In FIG. 5, TG represents a target in water, reference numeral 33 represents the wave front of an echo reflected from the target TG, d represents the interval (inter-center distance) of the arrays 11, 12, $\theta$ represents the phase difference of an echo and $\alpha$ represents the direction of the target TG (the coming direction of the echo). Accordingly, the direction $\alpha$ is represented as follows.

$$\alpha = \sin^{-1}(\theta \cdot \lambda / 2\pi d) \qquad (1)$$

Here, $\lambda$ represents the wavelength of the echo.

Furthermore, the distance to the target TG can be calculated by measuring the time from the transmission of the ultrasonic beam till the reception of the echo, and if the direction of the target TG and the distance to the target TG are calculated, the position of the target TG is determined. Furthermore, the signal intensity of the echo can be calculated on the basis of the amplitude of the echo received by each ultrasonic transducer z of the transducer array 10. These calculations are executed in the calculator 4. As described above, when the direction angle $\alpha$ and the distance of the target TG and the signal intensity of the echo are calculated, the processing of plotting the echo of the target TG on the screen is executed in the picture processor 5, and the picture of the echo is displayed on the screen of the display unit 6.

The above operation is not changed from the operation of the normal split beam type forward detection sonar.

Figure 6:
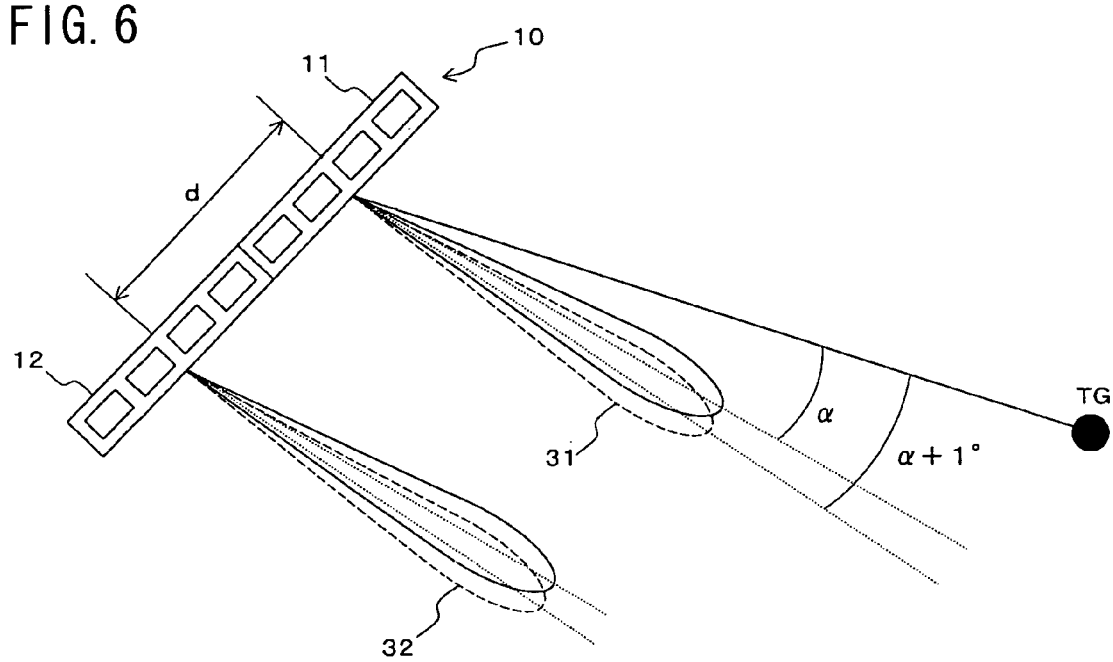
FIG. 6 is a diagram showing the principle of the present invention.

Next, an echo reliability judgment which is a feature of the present invention will be described. FIG. 6 is a diagram showing the principle of the present invention. In FIG. 6, the same parts as shown in FIG. 5 are represented by the same reference numerals.

The phase difference of an echo detected by the reception beams 31, 32 (solid lines) making a direction angle $\alpha$ with the target TG in the arrays 11 and 12 is represented by $\theta 1$, and the phase difference of the echo detected by the reception beams 31, 32 (broken lines) making a direction $\alpha+1°$ with the target TG in the arrays 11 and 12 is represented by $\theta 2$. In the phase detector 7, the difference $\Delta\theta$ of the phase differences=$\theta 1-\theta 2$ is detected from the respective detected phase differences $\theta 1$, $\theta 2$. From the equation (1), $$\theta = \{2\pi d \cdot \sin \alpha\}/\lambda \qquad (2)$$

Therefore, $\theta 1$ and $\theta 2$ are represented as follows:

$$\theta 1 = \{2\pi d \cdot \sin \alpha\}/\lambda$$

$$\theta 2 = \{2\pi d \cdot \sin(\alpha+1)\}/\lambda$$

Accordingly, the difference $\Delta\theta$ of the phase differences can be detected as follows:

$$\Delta\theta = \theta 1 - \theta 2 = 2\pi d \cdot \{\sin\alpha - \sin(\alpha+1)\}/\lambda \quad (3)$$

Here, in the calculation of $\theta 1 - \theta 2$ of the equation (3), when the phase detected by the beam 31, making a direction $\alpha$ with target TG is represented by $\phi_{31(\alpha)}$, the phase detected by the beam 31, making a direction $(\alpha+1°)$ with target TG is represented by $\phi_{31(\alpha+1)}$, the phase detected by the beam 32, making a direction $\alpha$ with target TG is represented by $\phi_{32(\alpha)}$, and the phase detected by the beam 32, making a direction $(\alpha+1°)$ with target TG is represented by $\phi_{32(\alpha+1)}$, the calculation may be executed as follows, in either way:

$$\theta 1 - \theta 2 = \||\phi_{31(\alpha)} - \phi_{32(\alpha)}| - |\phi_{31(\alpha+1)} - \phi_{32(\alpha+1)}|\|$$

or $$\theta 1 - \theta 2 = \||\phi_{31(\alpha)} - \phi_{31(\alpha+1)}| - |\phi_{32(\alpha)} - \phi_{32(\alpha+1)}|\|$$

This is because the same result can be obtained even if the calculation order is replaced.

In FIG. 6, the two reception beams 31, 32 are parallel to each other, however, these reception beams are not necessarily parallel to each other. Furthermore, in FIG. 6, the target TG is illustrated as being out of the direction range of the reception beams 31, 32. However, this illustration is used to make the figure easily understood, and actually the target TG exists in the direction ranges of the reception beams 31, 32.

Figure 7:
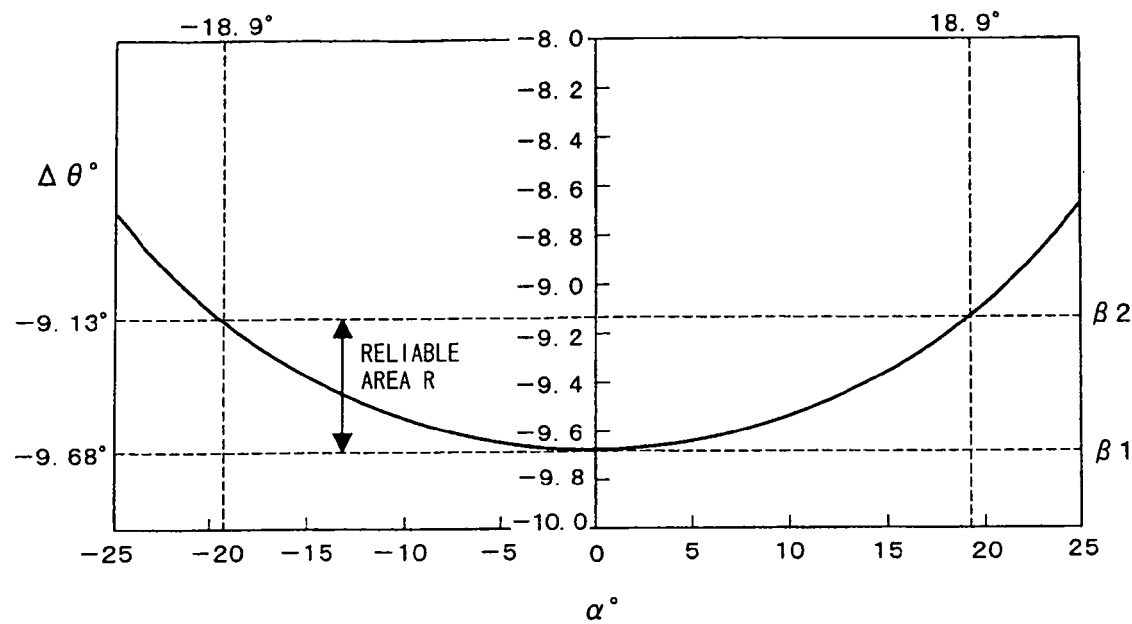
FIG. 7 is a graph showing the relationship between the angle of direction and the difference of phase differences.

The relationship between the direction angle $\alpha$ and the difference $\Delta\theta$ of the phase differences in equation (3) is shown in FIG. 7.

As shown in FIG. 7, threshold values $\beta 1$, $\beta 2$ are set to the difference $\Delta\theta$ of the phase differences, and the reliability judging unit 8 judges whether the difference $\Delta\theta$ is in a reliable area R between the threshold values $\beta 1$, $\beta 2$. When the difference $\Delta\theta$ is equal to a value within this reliable area R, it indicates that the received echo is based on a target that should be detected, such as a shallow place, a breakwater or the like, and when the difference $\Delta\theta$ is not a value within the reliable area R, it indicates that the received echo is based on bubbles and thus it is not a target that needs to be detected.

The phase difference $\theta$ is periodic with a period of $2\pi$ (360°). Therefore, when the direction angle $\alpha$ exceeds some value, the direction angle $\alpha$ is not uniquely settled with respect to some phase difference $\theta$. In this embodiment, assuming that the array interval d of FIG. 6 is set to 1.54$\lambda$, the phase difference $\theta$ wraps when the value of $\alpha$ exceeds 18.9°, and thus it is necessary from the equation (2) that $\alpha$ satisfies $-18.9° \leq \alpha \leq 18.9°$. In FIG. 7, when $\alpha$ varies between ±18.9°, the difference $\Delta\theta$ of the phase differences varies from $-9.68°$ to $-9.13°$ according to equation (3). Therefore, the threshold value $\beta 1$ is set to $-9.68°$, and the threshold value $\beta 2$ is set to $-9.13°$.

The reliability judging unit 8 makes the judgment described above, and outputs the judgment result to the picture processor 5. When the reliability judging unit 8 judges that the difference $\Delta\theta$ is in the reliable area R, the processing of displaying the echo with the color corresponding to the signal intensity is executed in the picture processor 5, and the picture of the echo is displayed with its original color on the screen of the display unit 6. On the other hand, when the reliability judging unit 8 judges that the difference $\Delta\theta$ is not in the reliable area R, the processing of displaying the echo concerned with a specific color tone or the processing of disabling the display of the echo concerned is executed in the picture processor 5.

Figure 8:
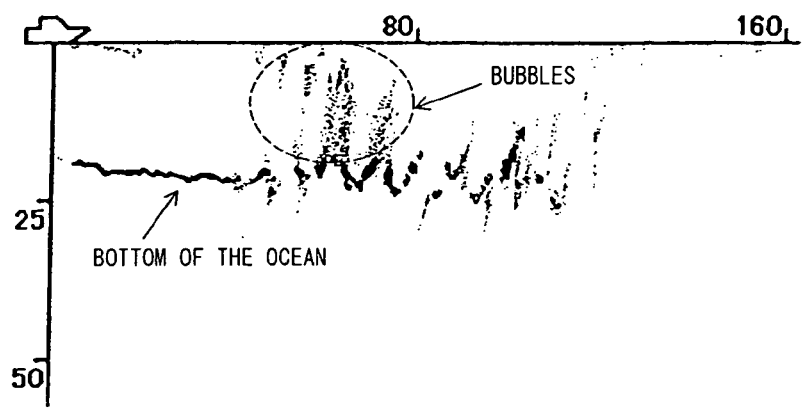
FIG. 8 shows an example of a screen when an echo of bubbles is displayed.
Figure 9:
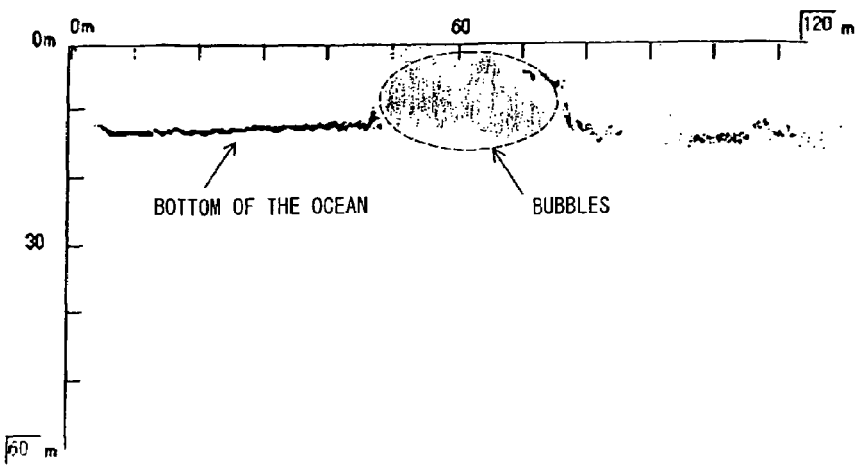
FIG. 9 shows an example of the screen when the echo of bubbles is displayed.

FIGS. 8 and 9 show examples of the screen of the display unit 6 when an echo based on a cluster of bubbles 15 is displayed with an inconspicuous color (for example, pale color of the sea). In this case, even when the signal intensity of the echo is large, it is not displayed with the original color corresponding to the signal intensity thereof (for example, brown), and thus there is no risk that the echo based on the bubbles is misidentified as an echo based on a shallow place, a breakwater or the like, so that the echo can be surely identified.

Figure 10:
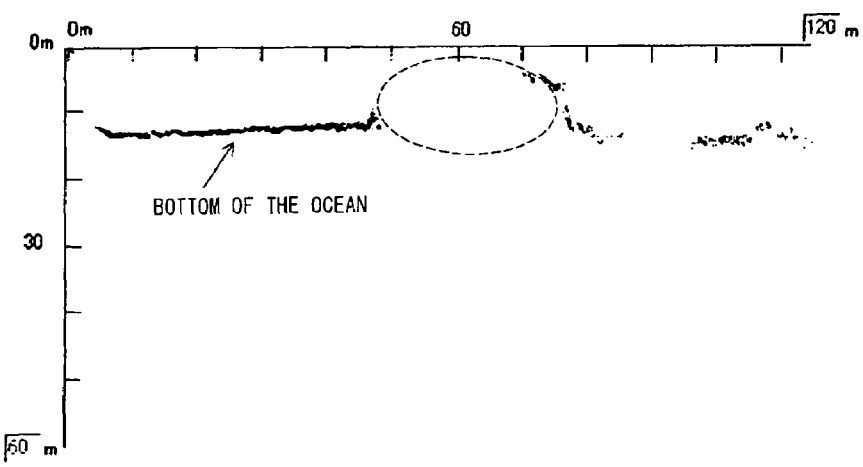
FIG. 10 shows an example of the screen when the echo of bubbles is not displayed.
Figure 11:
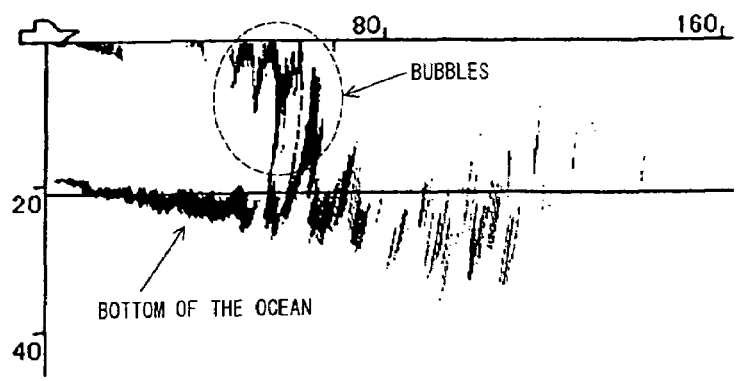
FIG. 11 shows an example of an echo picture in a conventional underwater detecting device.
Figure 12:
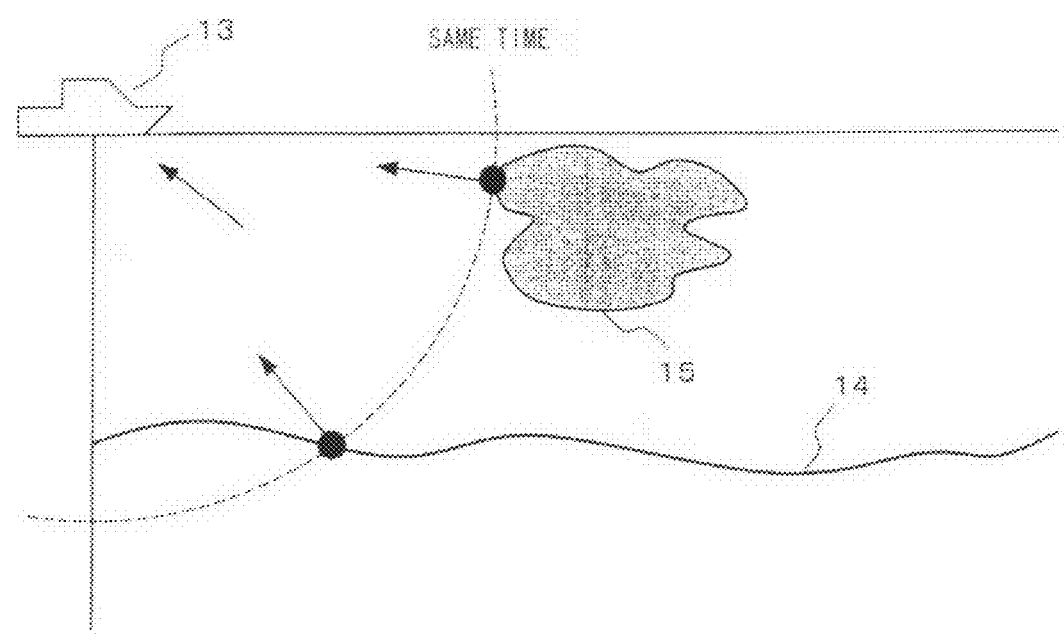
FIG. 12 is a diagram showing echoes coming from the bottom of the ocean and a cluster of bubbles at the same time.

FIG. 10 shows an example of the screen of the display unit 6 when the echo based on the bubble cluster 15 is not displayed. In this case, the echo based on the bubble cluster 15 as shown in FIG. 9 is never displayed in the portion surrounded by a broken line. Therefore, there is no risk that the echo based on the bubbles is misidentified as another echo, and thus the echo can be more surely identified.

As described above, according to the above-described embodiment, the echo is displayed with the color corresponding to the signal intensity thereof only when the difference $\Delta\theta$ of the phase differences of the echo is equal to a value within the reliable area R. Therefore, when echoes come from the bottom of the ocean 14 and the bubble cluster 15 at the same time, the echo based on the bubble cluster 15 is not displayed with the original color corresponding to the signal intensity thereof even when the signal intensity is large. Therefore, there is no risk that the echo based on bubbles is misidentified as the echo based on a breakwater or the like, and thus the echo can be surely identified.

The present invention is not limited to the above embodiment, and various modifications may be made. For example, the numerical values shown in FIG. 7 are merely examples, and other numerical values may be adopted. Furthermore, in the above embodiment, the forward detection sonar is used as an example of the underwater detection device. However, the present invention may be applied to general underwater detection devices adopting the split beam system, and it may be applied to a fish finder or the like.

What is claimed is:

1. An underwater detection device including a transducer array for transmitting ultrasonic waves to a predetermined area in water and receiving an echo reflected from a target, the transducer array being divided into a first array and a second array, a first reception beam formed by the first array and a second reception beam formed by the second array being formed in plural directions in the predetermined area to receive an echo, a coming direction of the echo being detected on the basis of the phase difference of the echo received by the first and second arrays and the distance between the first and second arrays, and also the picture of the echo concerned being displayed on the screen, comprising:

a detecting unit for detecting the difference between the phase difference of an echo detected by the first and second reception beams formed in some direction and the phase difference of the echo detected by the first and second reception beams formed in a direction which is rotated from the former direction by a predetermined angle; and a judging unit for judging whether the difference detected by the detecting unit is a value within a predetermined range, and when it is judged by the judging unit that the difference concerned is within the predetermined range, the echo concerned is displayed.

2. The underwater detection device according to claim 1, wherein when it is judged by the judging unit that the difference concerned is not a value within the predetermined range, the display of the echo concerned is disabled.

3. The underwater detection device according to claim 1, wherein when it is judged by the judging unit that the difference concerned is not a value within the predetermined range, the echo concerned is displayed with a specific color tone.

* * * * *